United States Patent
Wu

[11] Patent Number: 5,733,349
[45] Date of Patent: Mar. 31, 1998

[54] OIL COLLECTOR FOR AN UPRIGHT SMOKE EXHAUSTER

[76] Inventor: Chia-Ying Wu, P.O. Box 55-175, Taichung, Taiwan

[21] Appl. No.: 759,250

[22] Filed: Dec. 2, 1996

[51] Int. Cl.⁶ .................................................. B01D 46/00
[52] U.S. Cl. .................... 55/392; 55/395; 55/423; 55/429; 55/DIG. 36; 126/299 D
[58] Field of Search ............... 55/392, 394, 395, 55/396, 397, 398, 423, 280, DIG. 36, 428, 429, 430, 431; 126/299 R, 299 D, 299 F

[56] References Cited

U.S. PATENT DOCUMENTS

| | | | |
|---|---|---|---|
| 2,862,437 | 12/1958 | Smith et al. | 126/299 D |
| 3,364,664 | 1/1968 | Doane | 55/428 |
| 3,566,585 | 3/1971 | Voloshen et al. | 126/299 D |
| 4,153,044 | 5/1979 | Nett | 126/299 D |
| 4,186,727 | 2/1980 | Kaufman et al. | 126/299 D |
| 4,266,529 | 5/1981 | Gaylord | 55/DIG. 36 |
| 4,286,572 | 9/1981 | Searcy et al. | 126/299 D |
| 4,460,386 | 7/1984 | Diachuk | 55/DIG. 36 |
| 4,944,782 | 7/1990 | Rajendran et al. | 55/DIG. 36 |
| 5,228,428 | 7/1993 | Jang | 126/299 D |
| 5,537,988 | 7/1996 | Lin | 126/299 D |

Primary Examiner—Duane S. Smith

[57] ABSTRACT

An oil collector for an upright smoke exhauster is provided, the oil collector includes an oil filter of predetermined mesh and attached at a lower circumference with a guide device which is prepared to introduce the oil from the filter into an oil cup at a lower portion of the exhauster. The filter is engaged into a circular vent in the housing of the smoke exhauster together with the guide device which has a tongue of an inverse isosceles triangle projected downward from an under side of a sloped portion thereof for facilitating the oil to be concentrated on the lower point of the triangle and dripped directly into the oil cup. The improvement has been characterized in the simple structure and greater efficiency in removal of the oil from the smoke exhauster.

4 Claims, 2 Drawing Sheets

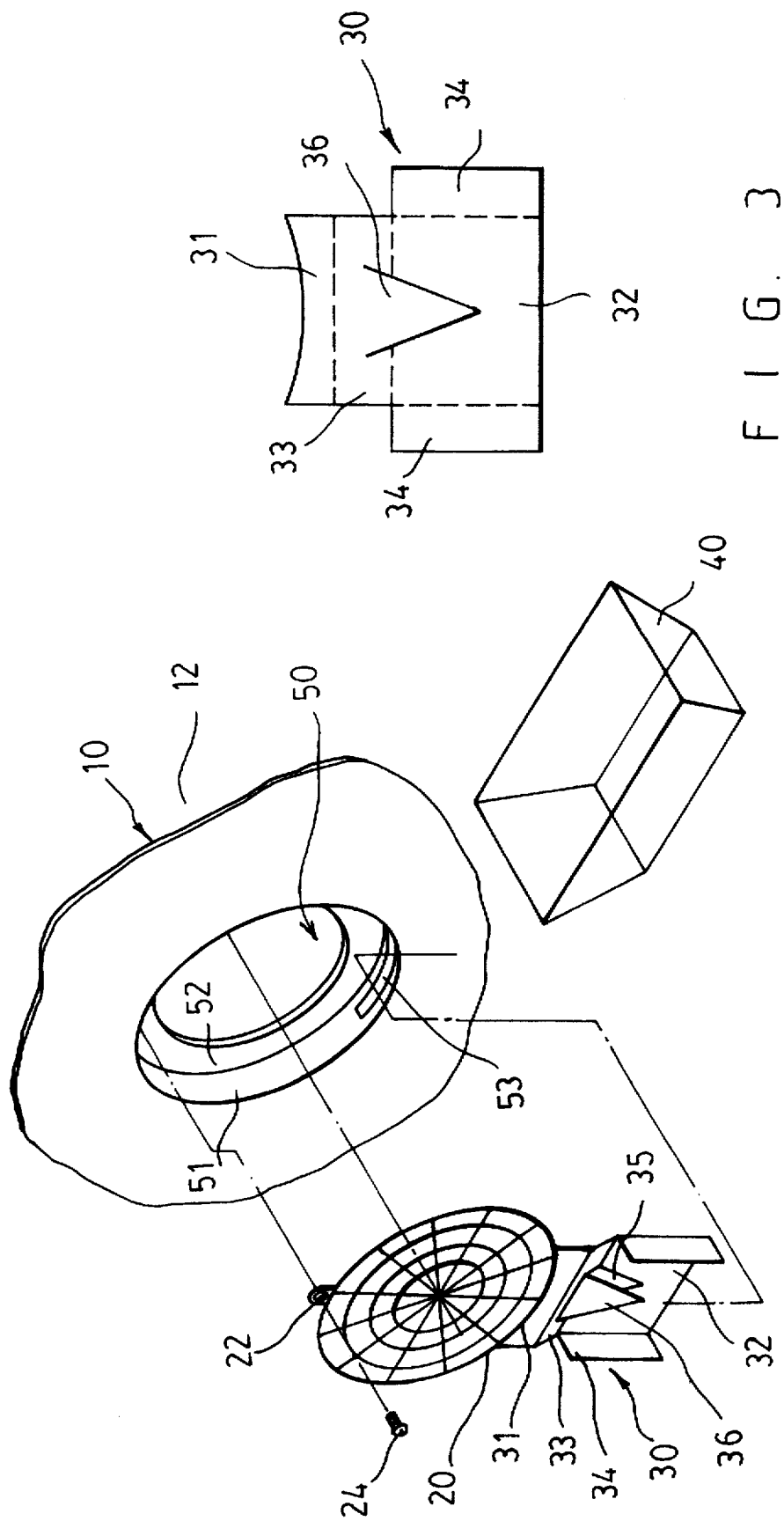

OIL COLLECTOR FOR AN UPRIGHT SMOKE EXHAUSTER

BACKGROUND OF THE INVENTION

The present invention relates to smoke exhauster and more particularly to an oil collector for an upright smoke exhauster which collects the oil and grime directly from an oil filter prior to that the oil smoking reaches to the rotor and prevents the oil and grime from concentrated in the filter.

Normally, a smoke exhauster is indispensable in a kitchen, the type which usually disposes over a stove or a cooking range is suitable to family use because it has low capacity to exhaust a minimum amount of oil smoke from the kitchen. In the kitchen of a restaurant or a snack, there creates large amount of the oil smoke that needs an upright smoke exhauster for which provides a stronger fan and which is uprightly disposed to a wall closer to the stove. FIG. 1 briefly illustrates the oil collecting device of an upright smoke exhauster which comprises housing 1, a vent 2 laterally formed at a proper position in the housing 1, an L-shaped section 3 formed around the circumferential edge of the vent 2 for securing the circumference 6 of a circular filter 5 by means of screw 7 and an oil cup 8 which secures to a lower portion of the housing 1 for collecting the oil dripped from a fan 4 inside the housing 1. However, as we know that the filter 2 must concentrate the oil greater than that of the fan 4 and has no way to go except becoming the grime gradually concentrated in the lower portion of the filter 2 to prevent the smoke from entering into the smoke exhauster. So that the oil filter 2 has to be frequently clean or replaced with a new one in order to maintain the smoke exhauster capable of working smoothly. Since the clean of the grime concentrated in the filter 2 is an arduous and tiresome task and the frequent replacement of a new filter is uneconomical.

SUMMARY OF THE PRESENT INVENTION

The present invention has a main object to provide an oil collector for an upright smoke exhauster which includes a guide device extended downwardly from the lower edge of the oil filter to introduce the oil from concentrated in the filter into the oil cup so as to prevent the oil from becoming the grime concentrated in the filter.

Another object of the present invention is to provide an oil collector for an upright smoke exhauster which is economical because it reduces the cleaning frequency of the oil filter and elongates the life of the filter.

Still another object of the present invention is to provide an oil collector for an upright smoke exhauster which prevents the oil from contaminated with the lower surface of the smoke exhauster or the perimeter of the stove.

Accordingly, the oil collector for an upright smoke exhauster of the present invention comprises generally an oil filter screw secured to a vent in the housing of the upright smoke exhauster, a guide device attached to a lower circumference of the filter and extended downward for introducing the oil from concentrated in the filter to an oil cup at a lower portion of the housing.

The present invention will become more fully understood by reference to the following detailed description thereof when read in conjunction with the attached drawings.

BRIEF DESCRIPTION OF THE DRAWINGS

FIG. 2 is an exploded perspective view to show the preferred embodiment of an oil collector according to the present invention, FIG. 3 is an elevational view to show a guide device of the oil collector of the present invention.

DETAILED DESCRIPTION OF THE PREFERRED EMBODIMENT

Figure 4:
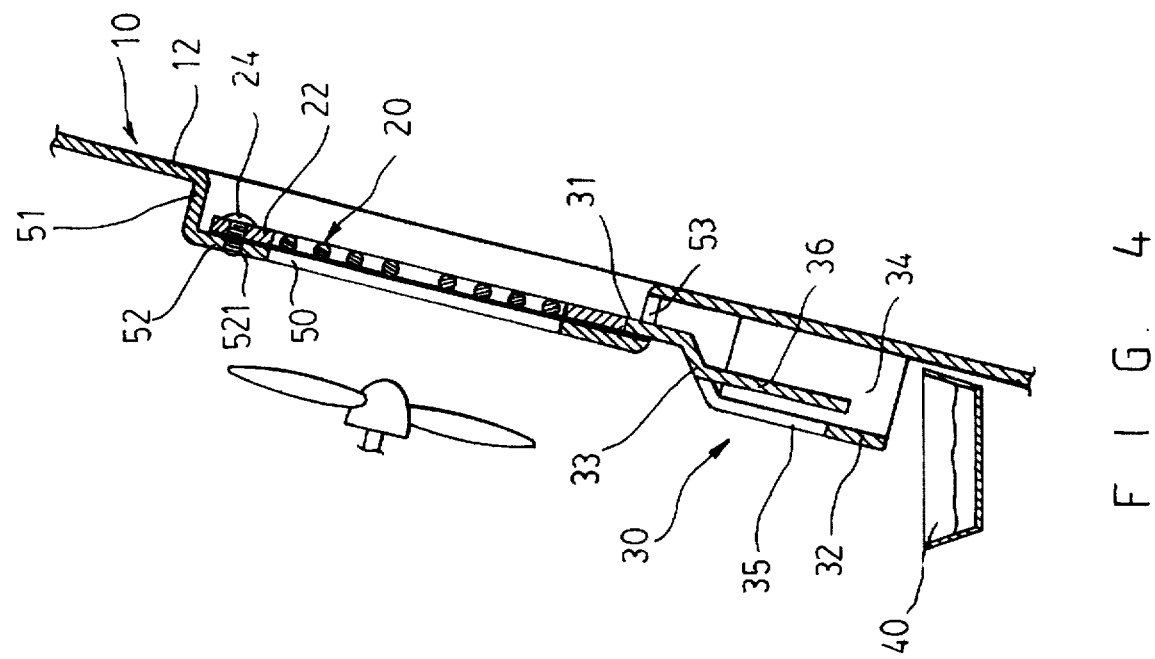
FIG. 4 is a sectional view to show an assemblage of the oil collector of the present invention.
Figure 1:
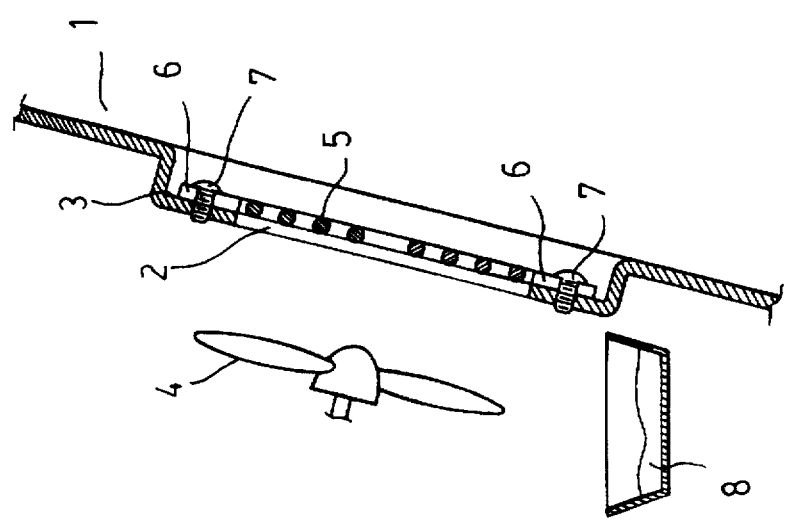
FIG. 1 is a sectional view to show an oil collector for an upright smoke exhauster of a prior art.

With reference to FIG. 2 of the drawings, the oil collector for an upright smoke exhauster of the present invention comprises generally an oil filter 20 of predetermined number of mesh upright disposed into an inwardly extended circular vent 50 in a housing 12 of an upright smoke exhauster 10, a guide device 30 attached to the lower circumference of the filter 20 for introducing the oil concentrated in the filter 20 into an oil cup 40 secured at a lower portion of the housing 12. The circular vent 50 has a circumferential flange 51 projected inward including a perpendicular portion 52 having a diameter less than the flange 51 integral with the inward circumference of the flange 51 and an elongate slot 53 centrally formed along a lower periphery wall thereof. The slot 53 has a length and width adequate to permit the oil filter 20 passing through. Further, a screw hole 521 is prepared in the upper center of the perpendicular portion 52 and made in registry with a retaining ring 22 centrally formed at an upper circumference of the oil filter 20. So that they are engageable and fastened by means of a screw 24 (as shown in FIG. 4).

The guide device 30 which is pressed of flat metal plate has a rectangular upper portion 31 parallel connected to the lower circumference of the oil filter 20 and a rectangular lower portion 32 connected to the upper portion 31 by a rectangular sloped portion 33 therebetween. A tongue 36 which is an inverse isosceles triangle directly incised from between the sloped portion 33 and the lower portion 32 projects downward from an underside of the sloped portion 33 so that an inverse isosceles triangular opening 35 is therefore formed in the sloped portion 33 and the lower portion 32 for guiding the oil from the upper surface of the sloped portion 33 to the tongue 36. A pair of rectangular abutments 34 formed perpendicular to the lateral sides of the lower portion 32 which are prepared to stop against an inner surface of the housing 12 to keep the guide device 30 away from the hosuing 12. FIG. 3 shows an incised metal plate prior to press into the guide device 30.

Referring to FIG. 4 which shows an assemblage of the oil collector of the present invention, in which the oil filter 20 is slid in place via the elongate slot 53 and closely attached to the less diameter perpendicular portion 52 of the flange 51 and then fastened by means of the screw 24, with the upper portion 31 of the guide device 30 mostly positioned above the slot 53. The tongue 36 integrated with the sloped portion 33 and the lower portion 32 is kept away from the inner surface of the housing 12 for the abutments 34 which stop against the housing 12 and directly towards the oil cup 40 thereunder. Since the vent 50 is completely blocked up by the oil filter 20 which collects most oil from the smoke therethrough, the oil concentrated in the filter 20 will flow downward and guide by the upper portion 31 and the sloped portion 33 introducing to the tongue 36. The oil then concentrates to the lower point of the inverse isosceles triangle and drips directly to the oil cup 40. The residual oil remaining on the fan will also be dripped into the oil cup 40. So that, upon the aforediscussed improvement, the oil collector of the present invention is advantageous to introduce the most portion of the oil from the filter 20 and directly drip to the oil cup 40 so as to prevent the oil from contaminated to the lower surface of the housing 12 and the perimeter of the cooking range thus elongate the life of the filter 20. Besides, the simple structure of the coupling device facilitates a ready replacement of the filter 20.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. An oil collector for an upright smoke exhauster comprising:

an oil filter of a predetermined mesh and having a retaining ring centrally formed at an upper periphery engageable into a circular vent in a housing of said upright smoke exhauster;

a guide device attached to a lower periphery of said oil filter, said guide device including a rectangular upper portion connected with said filter, a rectangular lower portion integrated with the upper portion by a sloped rectangular portion therebetween, a tongue means projected downward from an under side of the sloped rectangular portion for introducing the oil from said filter into an oil cup positioned thereunder and a pair of rectangular abutments perpendicularly extended outward from lateral sides of said rectangular lower portion for preventing said guide device from abutting said housing.

2. The oil collector according to claim 1 wherein said circular vent has an inwardly extended circumferential flange including a perpendicular portion having a diameter less than the flange integral with an inward circumference thereof, a screw hole centrally formed in an upper surface of the perpendicular portion made in registry with the retaining ring of said filter and an elongate slot centrally formed along a lower periphery wall of the flange for permitting said filter and a part of the rectangular upper portion of said guide device passing through.

3. The oil collector according to claim 1 wherein said guide device is pressed of metal plate.

4. The oil collector according to claim 1 wherein said tongue means is of an inverse isosceles triangle and directly incised from the sloped rectangular portion and the rectangular lower portion of said guide device therebetween and leaves an inverse isosceles triangular opening for guiding the oil on upper surface of the sloped rectangular portion to said tongue means.

* * * * *